(12) United States Patent
Otani et al.

(10) Patent No.: US 8,795,073 B2
(45) Date of Patent: Aug. 5, 2014

(54) GAME APPARATUS, STORAGE MEDIUM, GAME SYSTEM, AND GAME METHOD

(75) Inventors: Akira Otani, Kyoto (JP); Toshiharu Izuno, Kyoto (JP); Hiroyuki Kubota, Shibuya-ku (JP); Akiko Sugimoto, Shibuya-ku (JP)

(73) Assignee: Nintendo Co., Ltd., Kyoto (JP)

( * ) Notice: Subject to any disclaimer, the term of this patent is extended or adjusted under 35 U.S.C. 154(b) by 154 days.

(21) Appl. No.: 13/282,890

(22) Filed: Oct. 27, 2011

(65) Prior Publication Data

US 2012/0157196 A1 Jun. 21, 2012

(30) Foreign Application Priority Data

Dec. 21, 2010 (JP) ................................. 2010-284502

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |

(52) U.S. Cl.
USPC .................. 463/30; 463/31; 463/32; 463/33; 463/34

(58) Field of Classification Search
USPC .......................................................... 463/30
See application file for complete search history.

(56) References Cited

U.S. PATENT DOCUMENTS 7,371,163 B1 * 5/2008 Best .................................. 463/1
2009/0046141 A1   2/2009 Nojiri et al.

FOREIGN PATENT DOCUMENTS

JP         2007-75300         3/2007

OTHER PUBLICATIONS

Resident Evil 4, Jun. 21, 2007, Capcom, http://www.youtube.com/watch?v=dvRkLVFeW1E.*

* cited by examiner

*Primary Examiner* — Kevin Y Kim
(74) *Attorney, Agent, or Firm* — Nixon & Vanderhye, P.C.

(57) ABSTRACT

A first display section is caused to perform stereoscopic display, and a second display section is caused to perform non-stereoscopic display. A pointed position within an image displayed on the second display section is detected on the basis of an input of a player, it is determined that a second object within the image displayed on the second display section is operated, on the basis of a result of the detection, and a first object displayed on the first display section is changed on the basis of the determination.

27 Claims, 12 Drawing Sheets

GAME APPARATUS, STORAGE MEDIUM, GAME SYSTEM, AND GAME METHOD

CROSS REFERENCE TO RELATED APPLICATION

The disclosure of Japanese Patent Application No. 2010-284502, filed on Dec. 21, 2010, is incorporated herein by reference.

FIELD

The exemplary embodiments disclosed herein relate to a game apparatus, a storage medium, a game system, and a game method, and more particularly, relate to a game apparatus, a storage medium having a game program stored therein, a game system, and a game method which can implement stereoscopic display.

BACKGROUND AND SUMMARY

Conventionally, there is a game apparatus for displaying a stereoscopic image. For example, a certain literature discloses a game apparatus that implements stereoscopic display when stereoscopic glasses are installed to the game apparatus.

However, in the game apparatus of the above literature, a player can view only a stereoscopic screen through the glasses. Thus, while playing a game, the player views the same stereoscopic screen for a long period of time and may feel tired or bored.

Therefore, a feature of certain exemplary embodiments is to provide a game apparatus and the like which, during play of a game using a stereoscopic image, can relax player's eyes and give the player's eyes a change while the player continues to play the game, thereby preventing the player from feeling tired or bored.

Certain exemplary embodiments can have, for example, the following aspects to attain the feature mentioned above.

A first aspect of certain exemplary embodiments is directed to a game apparatus capable of performing stereoscopic display on the basis of a disparity. The game apparatus includes a first display section, a second display section, a first object locating section, a second object locating section, a first rendering control section, a second rendering control section, a first display control section, a second display control section, a pointed position detection section, and a game event control section. The first display section is configured to perform the stereoscopic display. The second display section is configured to perform non-stereoscopic display that is not the stereoscopic display. The first object locating section is configured to locate a first object in a first game space. The second object locating section is configured to locate a second object associated with the first object, in a second game space. The first rendering control section is configured to render the first game space in which the first object is located, with a disparity provided. The second rendering control section is configured to render the second game space in which the second object is located, without providing a disparity. The first display control section is configured to cause the first display section to stereoscopically display the first game space rendered by the first rendering control section. The second display control section is configured to cause the second display section to non-stereoscopically display the second game space rendered by the second rendering control section. The pointed position detection section is configured to detect a pointed position within an image displayed on the second display section, on the basis of an input of a player. The game event control section is configured to determine that the second object is operated, on the basis of a result of the detection by the pointed position detection section, and to change the first object displayed on the first display section, on the basis of the determination.

According to this configuration, when progressing a game, the player watches a non-stereoscopic image displayed on the second display section and operates the second object as one (part) of game plays. Due to this, a stereoscopic image and a non-stereoscopic image can be shown to the player without breaking game play to make the player feel uncomfortable. As a result, the eyes of the player can be relaxed and the player can give themselves a change. Thus, the player can be less likely to feel tired or bored due to keeping on watching a stereoscopic image. It should be noted that the first object is described, as an example, as a change object (51, 55 to 59) in an exemplary embodiment described below. In addition, the second object is described, as an example, as a person object 54 in the exemplary embodiment described below.

Further, the game apparatus may also include: an operation reception section configured to receive an operation of the player; and a player object control section configured to locate a player object in the first game space and controlling the player object on the basis of an operation received by the operation reception section, and the first rendering control section may render the first game space so as to set such a disparity that the first object is viewed on a far side of the player object.

According to this configuration, when having found an object (may not be the first object) that is viewed on the far side of the player object, the player watches a non-stereoscopic image displayed on the second display section and operates the second object, in order to confirm whether or not the found object is the first object (in order to confirm whether or not the found object changes). Due to this, during game play, while enjoining looking for the first object viewed on the far side of the player object, the player watches the non-stereoscopic image displayed on the second display section and operates the second object. As a result, the player can sometimes relax their eyes while looking for an object in a stereoscopic view. Thus, the player can more effectively enjoy a stereoscopic game.

Further, when determining that the second object is operated, the game event control section may cause the first rendering control section render the first game space so as to change a disparity of the first object such that the first object is viewed on a further near side.

According to this configuration, the first object is viewed so as to come to the near side. Thus, the first object can be changed by effectively using stereoscopic display.

Further, when determining that the second object is operated, the game event control section may cause the first rendering control section to change a color of the first object to a darker color and render the first game space.

According to this configuration, when having found an object (may not be the first object) that is displayed in a faint color, the player watches a non-stereoscopic image displayed on the second display section and operates the second object, in order to confirm whether the found object is the first object (in order to confirm whether or not the found object changes to a dark color). Due to this, during game play, while enjoining looking for the first object, the player watches the non-stereoscopic image displayed on the second display section and operates the second object. As a result, the player can sometimes relax their eyes while looking for an object in a stereoscopic view. Thus, the player can effectively enjoy a stereoscopic game.

Further, the first rendering control section may set a color of the first object to a color close to a background color and may render the first game space, and when determining that the second object is operated, the game event control section may cause the first rendering control section to change the color of the first object to a color different from the background color and render the first game space.

According to this configuration, when having found an object (may be not the first object) that is displayed in a color close to the background color, the player watches a non-stereoscopic image displayed on the second display section and operates the second object, in order to confirm whether or not the found object is the first object (in order to confirm the found object changes to a color different from the background color). Due to this, during game play, while enjoining looking for the first object, the player watches the non-stereoscopic image displayed on the second display section and operates the second object. As a result, the player can sometimes relax their eyes while looking for an object in a stereoscopic view. Thus, the player can effectively enjoy a stereoscopic game.

Further, when determining that the second object is operated, the game event control section may change a shape of the first object.

According to this configuration, when having found an object that seems to be the first object, the player watches a non-stereoscopic image displayed on the second display section and operates the second object, in order to confirm whether the found object is the first object (in order to confirm whether or not the found object changes in shape). Due to this, during game play, while enjoining looking for the first object, the player watches the non-stereoscopic image displayed on the second display section and operates the second object. As a result, the player can sometimes relax their eyes while looking for an object in a stereoscopic view. Thus, the player can effectively enjoy a stereoscopic game.

Further, the first game space may be set such that the player object cannot advance further therein, and when determining that the second object is operated, the game event control section may change the first object so as to allow the player object to advance further.

According to this configuration, in order to allow the player object to advance further, the player watches a non-stereoscopic image displayed on the second display section and operates the second object. As a result, a non-stereoscopic image can certainly be shown to the player. Thus, the eyes of the player can assuredly be relaxed.

Further, the second object may be composed of a plurality of parts, and at least one of the plurality of parts may be associated as an associated part with the first object, and when determining that the associated part of the second object is operated, the game event control section may change the first object in accordance with an operation on the associated part.

According to this configuration, in order to change the first object, the player has to operate the associated part among the plurality of parts constituting the second object. Due to this, the player attempts to operate each part of the second object. As a result, a non-stereoscopic image can be shown to the player for a sufficient period of time while entertaining the player.

Further, when determining that the associated part of the second object is operated, the game event control section may cause the second display control section to cause the second display section to display the associated part in an enlarged manner, and may change the first object in accordance with an operation on the associated part displayed in an enlarged manner.

According to this configuration, when the associated part of the second object is operated, the part is displayed in an enlarged manner, and thus the player can recognize that this part is the associated part and is a processing target part. In addition, the first object is changed in accordance with an operation on the part displayed in an enlarged manner. Thus, the player attempts to perform various operations on this part. As a result, a non-stereoscopic image can be shown to the player for a sufficient period of time while entertaining the player.

Further, the pointed position detection section may detect a pointed position within an image displayed on the second display section, by using a touch panel installed in the second display section.

According to this configuration, the player performs a touch operation on the touch panel to operate the second object. Thus, the player can perform an operation on the second object through an intuitive motion and with good operability.

A second aspect of certain exemplary embodiments is directed to a game apparatus capable of performing stereoscopic display on the basis of a disparity. The game apparatus includes a first display section, a second display section, a first object locating section, a second object locating section, a first rendering control section, a second rendering control section, a first display control section, a second display control section, a pointed position detection section, and a game event control section. The first display section is configured to perform the stereoscopic display. The second display section is configured to perform non-stereoscopic display that is not the stereoscopic display. The first object locating section is configured to locate a first object in a first game space. The second object locating section is configured to locate a second object in a second game space. The first rendering control section is configured to render the first game space with a disparity provided. The second rendering control section is configured to render the second game space in which the second object is located, without providing a disparity. The first display control section is configured to cause the first display section to stereoscopically display the first game space rendered by the first rendering control section. The second display control section is configured to cause the second display section to non-stereoscopically display the second game space rendered by the second rendering control section. The pointed position detection section is configured to detect a pointed position within an image displayed on the second display section, on the basis of an input of a player. The game event control section is configured to determine that the second object is operated, on the basis of a result of the detection by the pointed position detection section, and to cause the first object locating section to locate the first object in the first game space, on the basis of the determination, to cause the first object to emerge in an image displayed on the first display section.

According to this configuration, when progressing a game, the player watches a non-stereoscopic image displayed on the second display section and operates the second object as one (part) of game plays. Due to this, a stereoscopic image and a non-stereoscopic image can be shown to the player without breaking game play to make the player feel uncomfortable. As a result, the eyes of the player can be relaxed. Thus, the player can be prevented from feeling tired due to keeping on watching a stereoscopic image. It should be noted that the first object is described, as an example, as a change object 60 in the exemplary embodiment described below. In addition, the second object is described, as an example, as the person object 54 in the exemplary embodiment described below.

In the above description, certain exemplary embodiments are configured as a game apparatus. However, certain exemplary embodiments may be configured as a game program, a game method, or a game system. In addition, certain exemplary embodiments may be configured as a computer-readable storage medium having the game program stored therein.

According to certain exemplary embodiments, a game apparatus and the like can be provided which, during play of a game using a stereoscopic image, can relax the eyes of a player and can make the player less likely to feel tired or bored, without breaking the play.

These and other objects, features, aspects and advantages of certain exemplary embodiments will become more apparent from the following detailed description of certain exemplary embodiments when taken in conjunction with the accompanying drawings.

DETAILED DESCRIPTION OF NON-LIMITING EXAMPLE EMBODIMENTS (Exemplary Embodiment)

Hereinafter, a game apparatus that is an information processing apparatus according to an exemplary embodiment will be described. It should be noted that the exemplary embodiments disclosed herein are not limited to such an apparatus, may be an information processing system that implements the functions of such an apparatus, may be an information processing method in such an apparatus, and may be an information processing program executed on such an apparatus. Further, the exemplary embodiments disclosed herein may be a computer-readable storage medium having the information processing program stored therein.

(External Structure of Game Apparatus)

Figure 1:
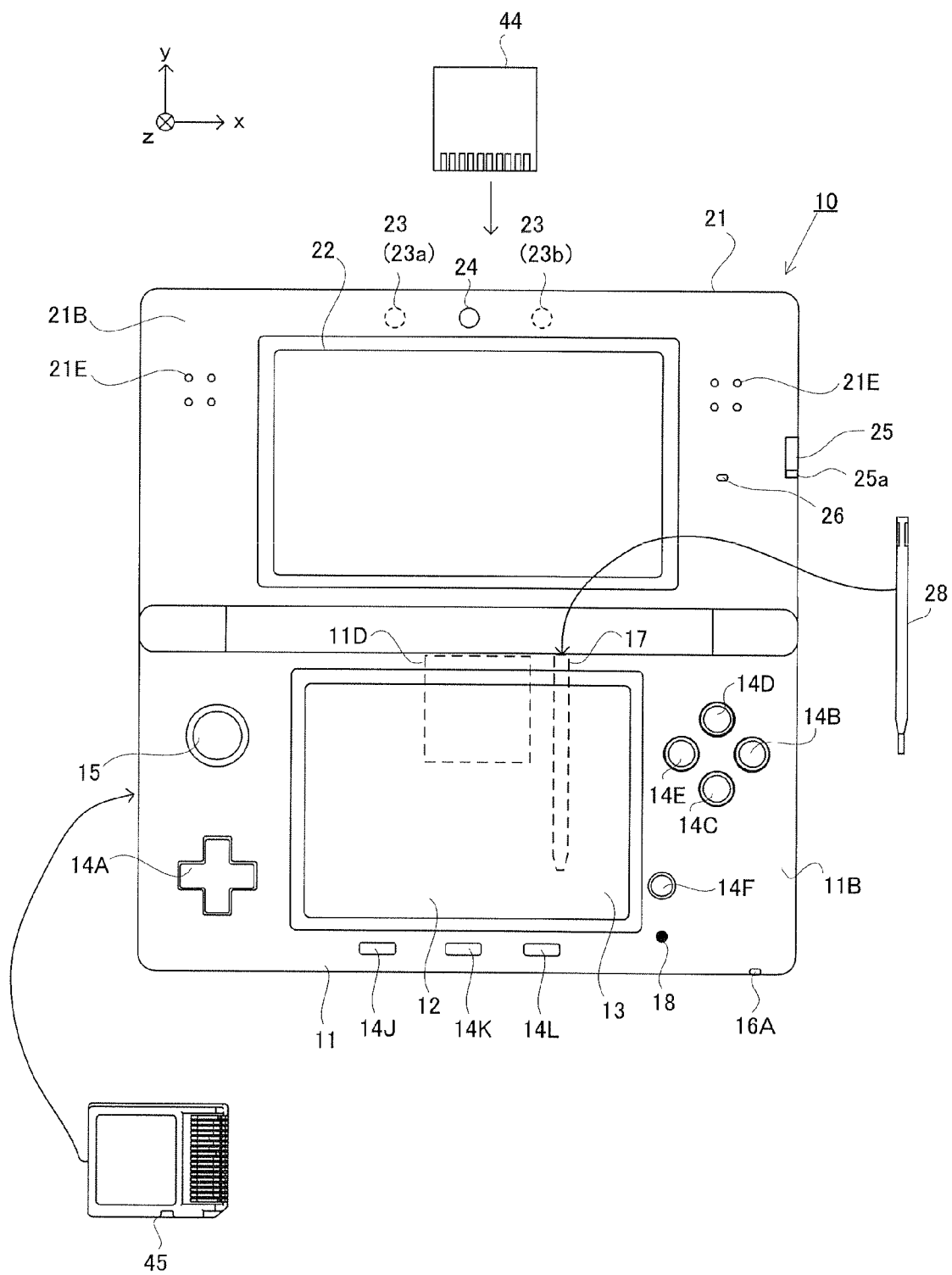
FIG. 1 is a front view of a non-limiting example of a game apparatus 10 in an opened state.
Figure 2:
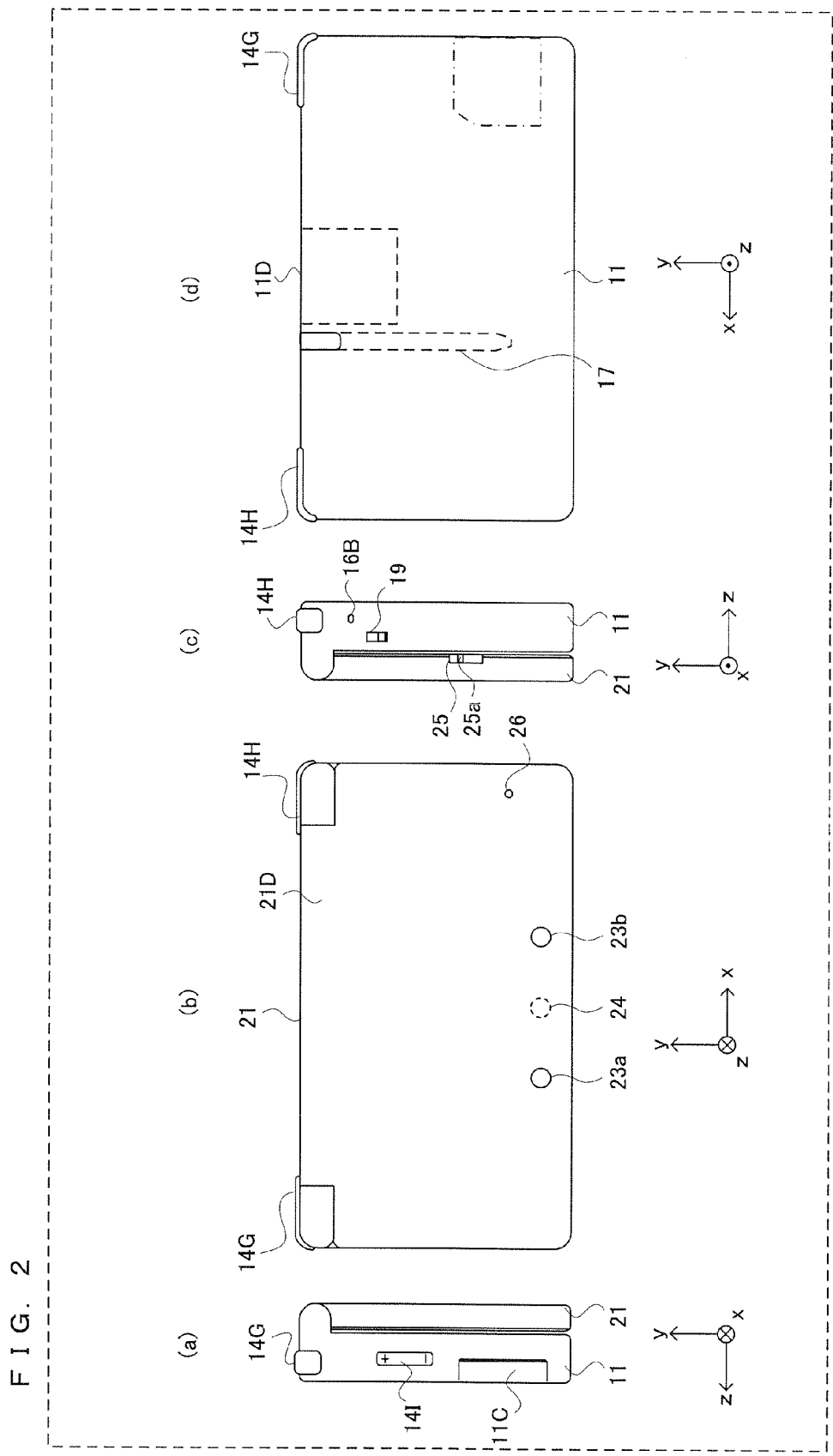
FIG. 2 is a left side view, a front view, a right side view, and a rear view of a non-limiting example of the game apparatus 10 in a closed state.

Hereinafter, the game apparatus according to the exemplary embodiment will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the exemplary embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the exemplary embodiment, the touch panel 13 may be, but is not limited to, a resistive film type touch panel. A touch panel of any type such as electrostatic capacitance type may be used. In the exemplary embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a virtual three-dimensional space is executed by the game apparatus 10, the analog stick 15 acts as an input device for moving the predetermined object in the virtual three-dimensional space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(b) and 2(d), an L button 14G and an R button 14H are provided on the upper side surface of the lower housing 11 The L button 14G and the R button 14H can act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the exemplary embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image (stereoscopic image). Further, in the exemplary embodiment, an image for a left eye and an image for a right eye which have a disparity therebetween are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are displayed temporally alternately may be used. Further, in the exemplary embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the exemplary embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. In addition, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be configured to be lit up only when the upper LCD 22 is in the stereoscopic display mode and program processing for displaying a stereoscopic image is performed.

Further, a speaker hole 21E is provided on the inner side surface of the upper housing 21. A sound is outputted through the speaker hole 21E from a speaker 43 described below.

(Internal Configuration of Game Apparatus 10)

Figure 3:
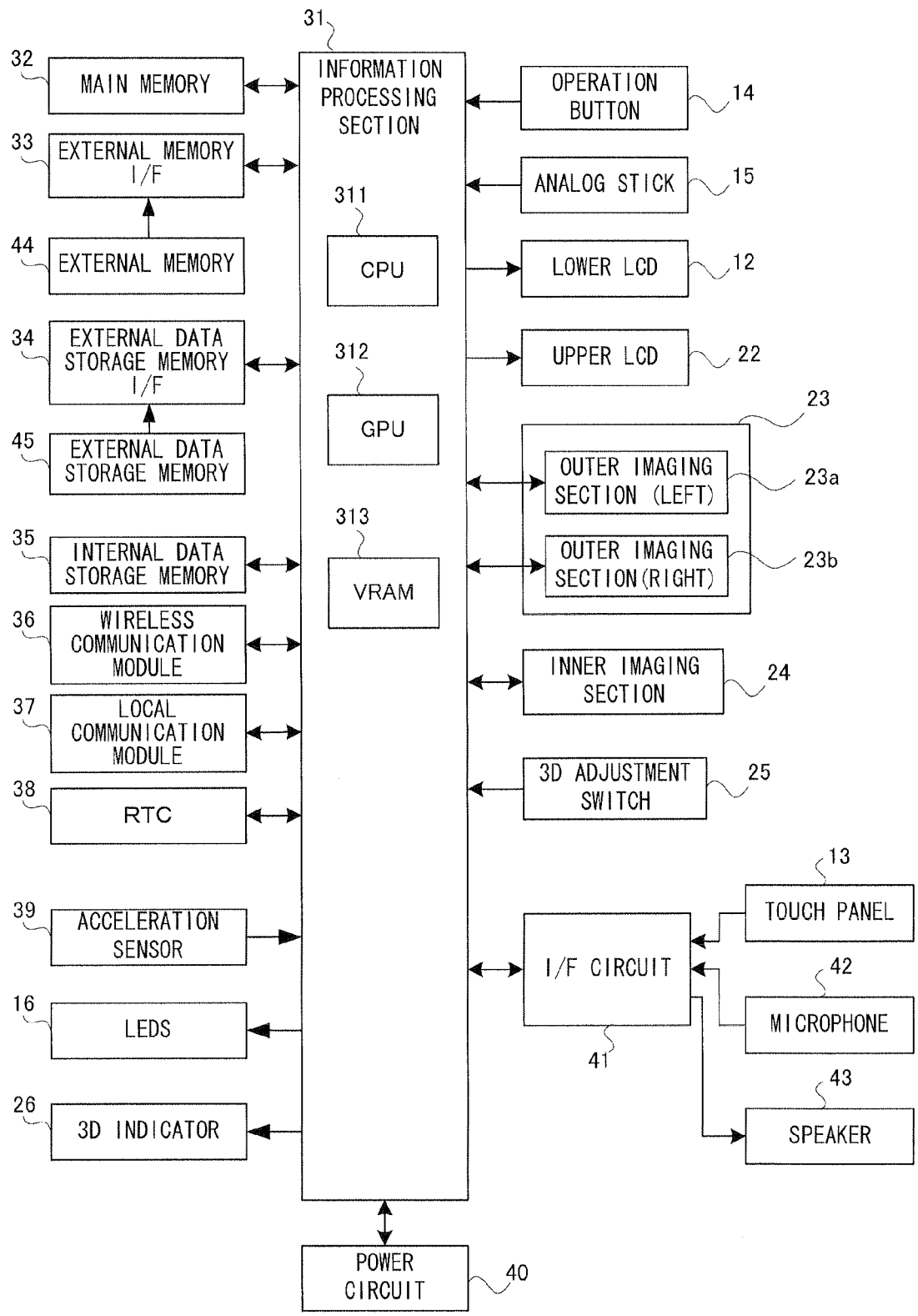
FIG. 3 is a block diagram illustrating a non-limiting example of an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program acquired from the outside (the external memory 44, another device, or the like), for example. In the exemplary embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol and infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10. In addition to (or instead of) the acceleration sensor 39, another sensor such as an angle sensor or an angular velocity sensor may be connected to the information processing section 31, and an orientation and a motion of the game apparatus 10 may be detected by this sensor.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The LED 16 (16A and 16B) is connected to the information processing section 31. The information processing section 31 uses the LED 16 to notify the user of the ON/OFF state of the power supply of the game apparatus 10, or to notify the user of the establishment state of the wireless communication of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The analog stick 15 is connected to the information processing section 31. From the analog stick 15, operation data indicating an analogue input (an operation direction and an operation amount) on the analog stick 15 is outputted to the information processing section 31. The information processing section 31 obtains the operation data from the analog stick 15 to perform processing corresponding to the input on the analog stick 15.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 causes the lower LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Characteristic Operation in Exemplary Embodiment)

Next, with reference to FIGS. 4 to 10, an outline of a characteristic operation in the exemplary embodiment will be described. FIGS. 4 to 10 each illustrate an example of the upper LCD 22 on which a stereoscopic image is displayed and the lower LCD 12 on which a non-stereoscopic image is displayed. Here, a non-stereoscopic image is an image that is not a stereoscopic image and is an image that is not stereoscopically viewed by a player. In FIGS. 4 to 10, each stereoscopic image shown on the upper side is actually composed of an image for a left eye and an image for a right eye between which a disparity is set, and is stereoscopically viewed with both eyes of the player, but is illustrated as a planar image for convenience of expression of the drawings.

In the exemplary embodiment, as an example, a game is assumed in which the player operates the analog stick 15 or the operation button 14 to cause a player object 50, displayed on the upper LCD 22 for performing stereoscopic display, to advance (move) in a direction in which the player object 50 should advance. As the player object 50 advances, a situation (hereinafter, referred to as an advancement impossible situation) appears where the player object 50 cannot advance further. When the advancement impossible situation appears, the player operates a person object 54 displayed on the lower LCD 12 for performing non-stereoscopic display, with the touch pen 28 to change a change object (51 or the like) that is displayed on the upper LCD 22 and associated with the person object 54. As a result of the change of the change object, a state is provided where the player object 50 can advance further, and the player operates the analog stick 15 or the like to cause the player object 50 to advance. A plurality of advancement impossible situations are set so as to appear during progress of the game, and various types of change objects are set for the advancement impossible situations, respectively. Hereinafter, an example of the advancement impossible situations and the various types of change objects set for the advancement impossible situations will be described in detail.

Figure 4:
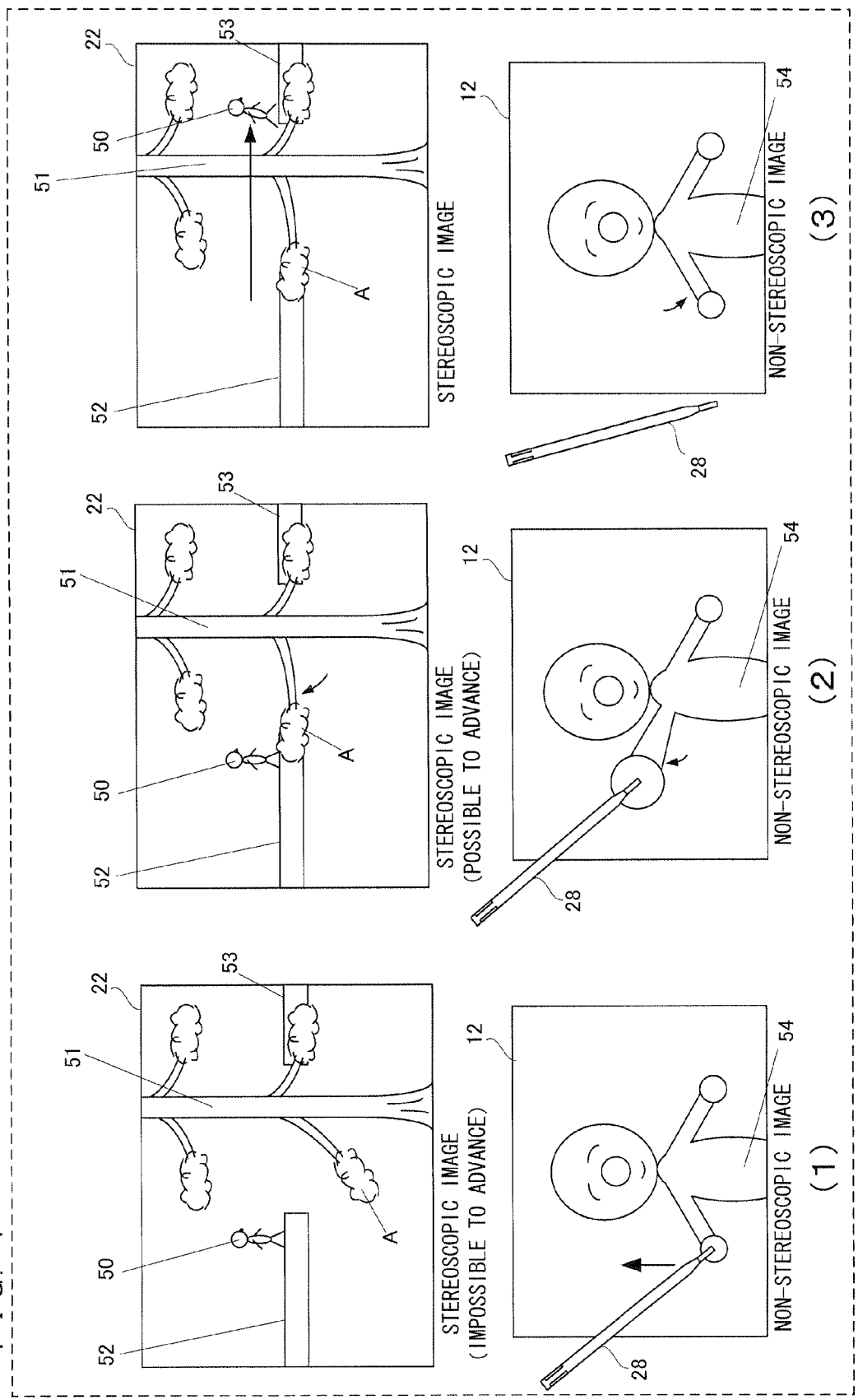
FIG. 4 is diagrams illustrating a non-limiting example of an upper LCD 22 on which a stereoscopic image is displayed and a lower LCD 12 on which a non-stereoscopic image is displayed.

First, an example of the advancement impossible situation and a type of a change object that changes in shape will be described with reference to FIG. 4. In FIG. 4(1), an advancement impossible situation where the interval between a path object 52 and a path object 53 is large and thus the player object 50 cannot move (advance) from the path object 52 to the path object 53 is stereoscopically displayed on the upper LCD 22. Here, as shown in FIG. 4(1), in the stereoscopic image on the upper LCD 22, a change object 51 that is a tree object is displayed between the path object 52 and the path object 53. The path objects 52 and 53, the change object 51, and the player object 50 are displayed with such disparities that these objects are viewed at the same depth as seen from the player (these objects are located in positions of the same depth). A branch A of the change object 51 has a shape that suggests a right arm part of the person object 54 displayed on the lower LCD 12 and that makes the player imagine that if the branch A deforms to rise, the player object 50 can advance over the branch A. As shown in FIG. 4(1), the player touches, with the touch pen 28, the right arm part of the person object 54 that is suggested by the shape of the branch A of the change object 51. The right arm part of the person object 54 is associated with the branch A of the change object 51, and is displayed in an enlarged manner when this touching is made. As shown in FIG. 4(2), when the player slides the touching touch pen 28 in a direction in which the right arm of the person object 54 is raised, the branch A of the change object 51 associated with the right arm deforms to rise. As a result, a state is provided where the player object 50 can advance over the branch A. Then, when the player separates the touch pen 28 from the lower LCD 12, the raised right arm returns to its original state as shown in FIG. 4(3). Meanwhile, the branch A of the change object 51 keeps the deformed state. Then, the player operates the analog stick 15 or the like to cause the player object 50 to go over the branch A to advance from the path object 52 to the path object 53 as shown in FIG. 4(3). As a result, the game progresses. Then, the game progresses to some extent, and the player object 50 reaches the next advancement impossible situation. The player operates the person object 54 with the touch pen 28 to change the next change object. In this manner, an advancement impossible situation is set as a game event so as to appear each time the game progresses to some extent.

Figure 5:
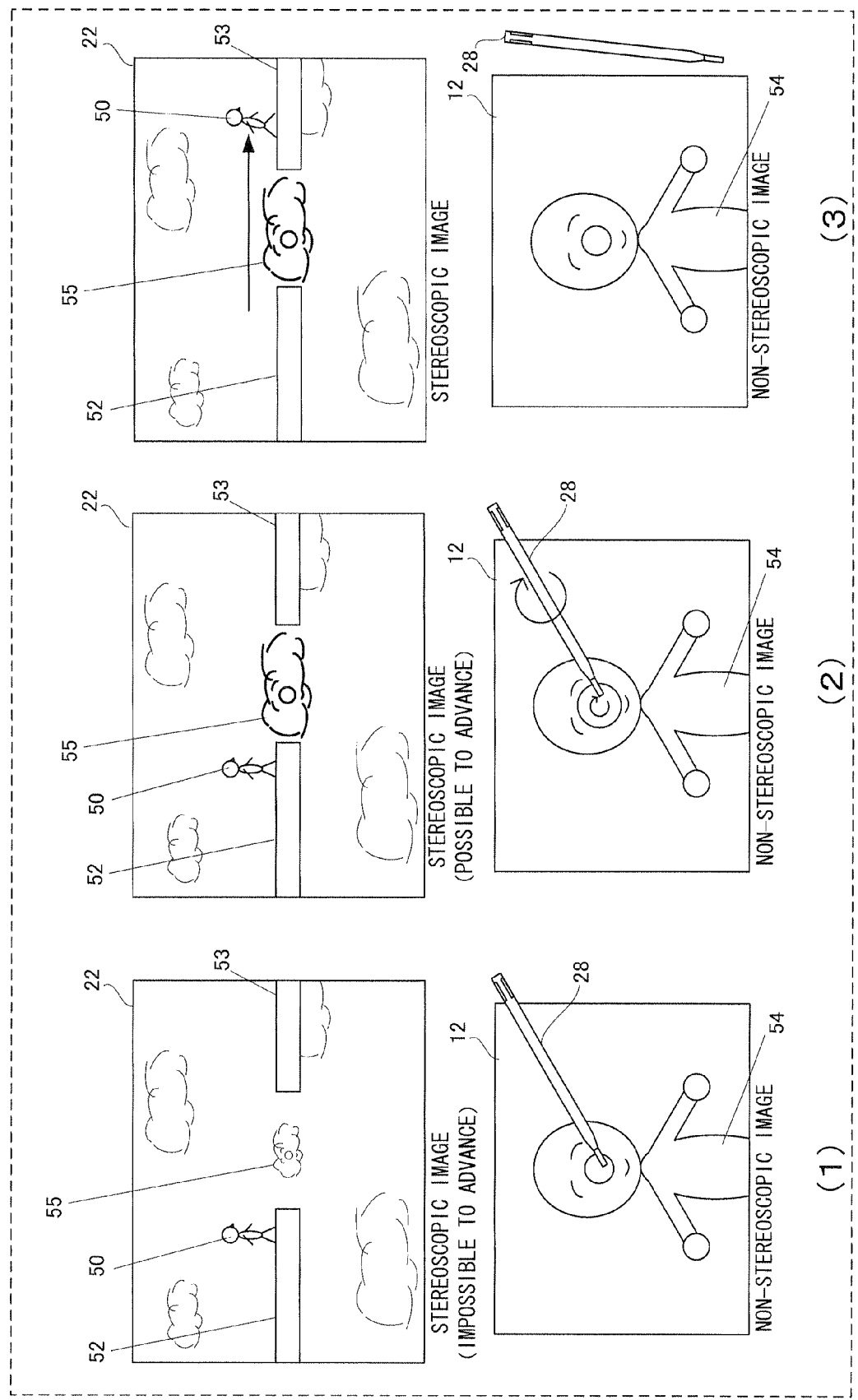
FIG. 5 is diagrams illustrating a non-limiting example of the upper LCD 22 on which a stereoscopic image is displayed and the lower LCD 12 on which a non-stereoscopic image is displayed.

Next, an example of a type of a change object that changes so as to come to the near side will be described with reference to FIG. 5. In FIG. 5(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. The path objects 52 and 53 and the player object 50 are displayed with such disparities that these objects are viewed at the same depth as seen from the player (these objects are located in positions of the same depth). Here, as shown in FIG. 5(1), in the stereoscopic image on the upper LCD 22, a change object 55 that is a cloud object is displayed between the path object 52 and the path object 53. The change object 55 has a portion (a round portion) that suggests a nose part of the person object 54 displayed on the lower LCD 12. In addition, the change object 55 is displayed with such a disparity that the change object 55 is viewed in the stereoscopic image on the far side of the path objects 52 and 53 and the player object 50 as seen from the player, and is located in such a position that the player is made to imagine that when the change object 55 comes to the near side (the player side), the player object 50 can advance over the change object 55. As shown in FIG. 5(1), the player touches, with the touch pen 28, the nose part of the person object 54 that is suggested by the round portion of the change object 55. The nose part of the person object 54 is associated with the change object 55, and is displayed in an enlarged manner when this touching is made. As shown in FIG. 5(2), when the player circularly moves the touching touch pen 28 as if stroking the nose of the person object 54, the change object 55 associated with the nose changes so as to come to the near side (the player side). As a result, a state is provided where the player object 50 can advance over the change object 55. Then, when the player separates the touch pen 28 from the lower LCD 12, the nose displayed in an enlarged manner returns to its original state as shown in FIG. 5(3). Meanwhile, the change object 55 keeps the changed state. Then, the player operates the analog stick 15 or the like to cause the player object 50 to go over the change object 55 to advance from the path object 52 to the path object 53 as shown in FIG. 5(3). As a result, the game progresses.

Figure 6:
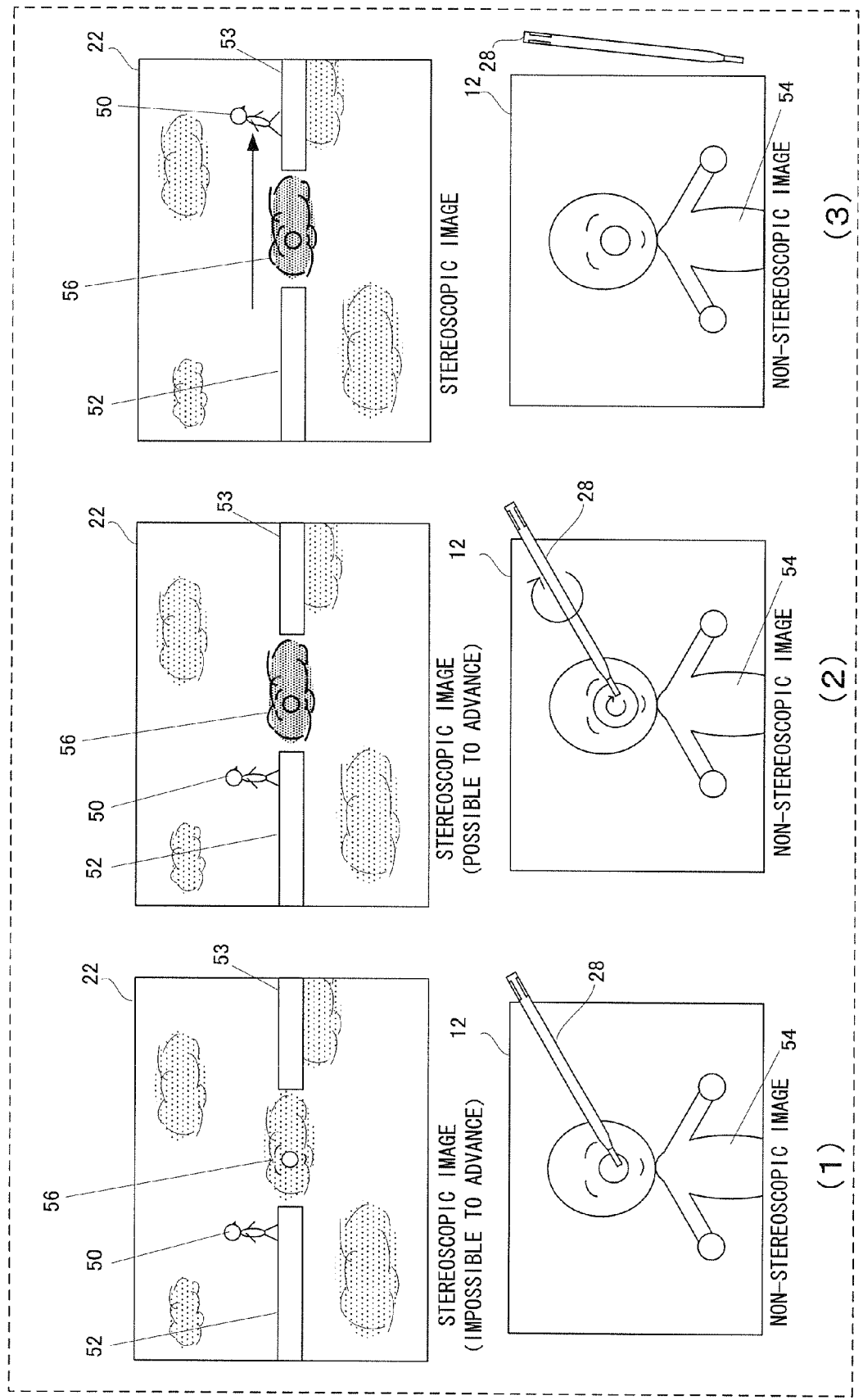
FIG. 6 is diagrams illustrating a non-limiting example of the upper LCD 22 on which a stereoscopic image is displayed and the lower LCD 12 on which a non-stereoscopic image is displayed.

Next, an example of a type of a change object that changes so as to become dark in color will be described with reference to FIG. 6. In FIG. 6(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. Here, as shown in FIG. 6(1), in the stereoscopic image on the upper LCD 22, a change object 56 that is a cloud object is displayed between the path object 52 and the path object 53. The path objects 52 and 53, the change object 56, and the player object 50 are displayed with such disparities that these objects are viewed at the same depth as seen from the player (these objects are located in positions of the same depth). The change object 56 has a portion (a round portion) that suggests the nose part of the person object 54 displayed on the lower LCD 12. In addition, the change object 56 is located in such a position that the player is made to imagine that when the density of the change object 56 as a cloud becomes high as if the player object 50 could stand on the change object 56, the player object 50 can advance over the change object 56. As shown in FIG. 6(1), the player touches, with the touch pen 28, the nose part of the person object 54 that is suggested by the round portion of the change object 56. The nose part of the person object 54 is associated with the change object 56, and is displayed in an enlarged manner when this touching is made. As shown in FIG. 6(2), when the player circularly moves the touching touch pen 28 as if stroking the nose of the person object 54, the change object 56 associated with the nose changes so as to become dark in color, which makes the player feel that the density of the change object 56 as a cloud becomes high. As a result, a state is provided where the player object 50 can advance over the change object 56. Then, when the player separates the touch pen 28 from the lower LCD 12, the nose displayed in an enlarged manner returns to its original state as shown in FIG. 6(3). Meanwhile, the change object 56 keeps the changed state. Then, the player operates the analog stick 15 or the like to cause the player object 50 to go over the change object 56 to advance from the path object 52 to the path object 53 as shown in FIG. 6(3). As a result, the game progresses.

Figure 7:
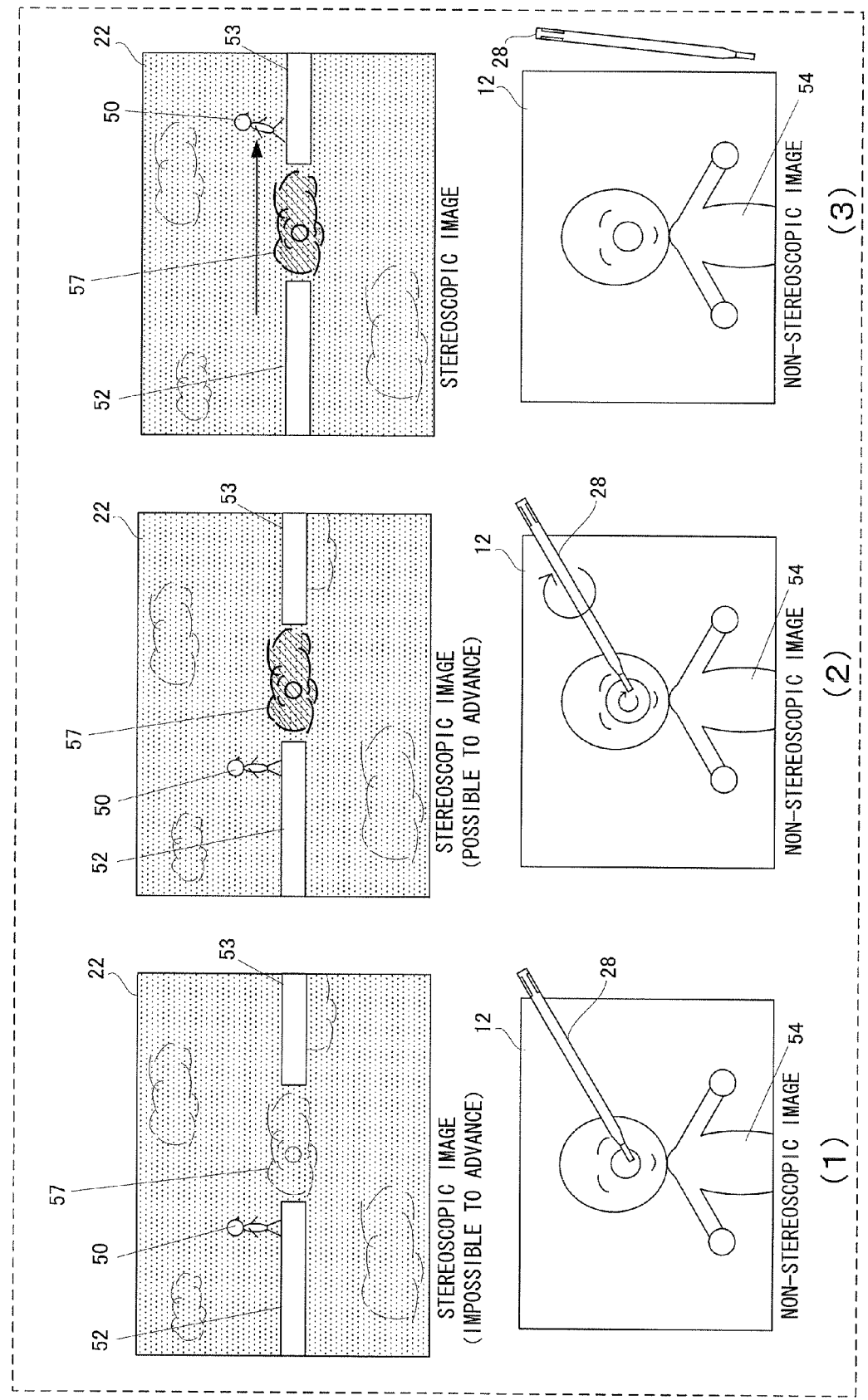
FIG. 7 is diagrams illustrating a non-limiting example of the upper LCD 22 on which a stereoscopic image is displayed and the lower LCD 12 on which a non-stereoscopic image is displayed.

Next, an example of a type of a change object that changes from the same color as the background color to a color different from the background color will be described with reference to FIG. 7. In FIG. 7(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. Here, as shown in FIG. 7(1), in the stereoscopic image on the upper LCD 22, a change object 57 that is a cloud object is displayed between the path object 52 and the path object 53. The path objects 52 and 53, the change object 57, and the player object 50 are displayed with such disparities that these objects are viewed at the same depth as seen from the player (these objects are located in positions of the same depth). The change object 57 has a portion (a round portion) that suggests the nose part of the person object 54 displayed on the lower LCD 12. In addition, the change object 57 has the same color as the background color, and is located in such a position that the player is made to imagine when the density of the change object 57 as a cloud becomes high as if the player object 50 could stand on the change object 57, the player object 50 can advance over the change object 57. As shown in FIG. 7(1), the player touches, with the touch pen 28, the nose part of the person object 54 that is suggested by the round portion of the change object 57. The nose part is associated with the change object 57, and is displayed in an enlarged manner when this touching is made. As shown in FIG. 7(2), when the player circularly moves the touching touch pen 28 as if stroking the nose of the person object 54, the change object 57 associated with the nose changes from the background color to a color that makes the player feel that the density of the change object 57 as a cloud becomes high. As a result, a state is provided where the player object 50 can advance over the change object 57. Then, when the player separates the touch pen 28 from the lower LCD 12, the nose displayed in an enlarged manner returns to its original state as shown in FIG. 7(3). Meanwhile, the change object 57 keeps the changed state. Then, the player operates the analog stick 15 or the like to cause the player object 50 to go over the change object 57 to advance from the path object 52 to the path object 53 as shown in FIG. 7(3). As a result, the game progresses.

Figure 8:
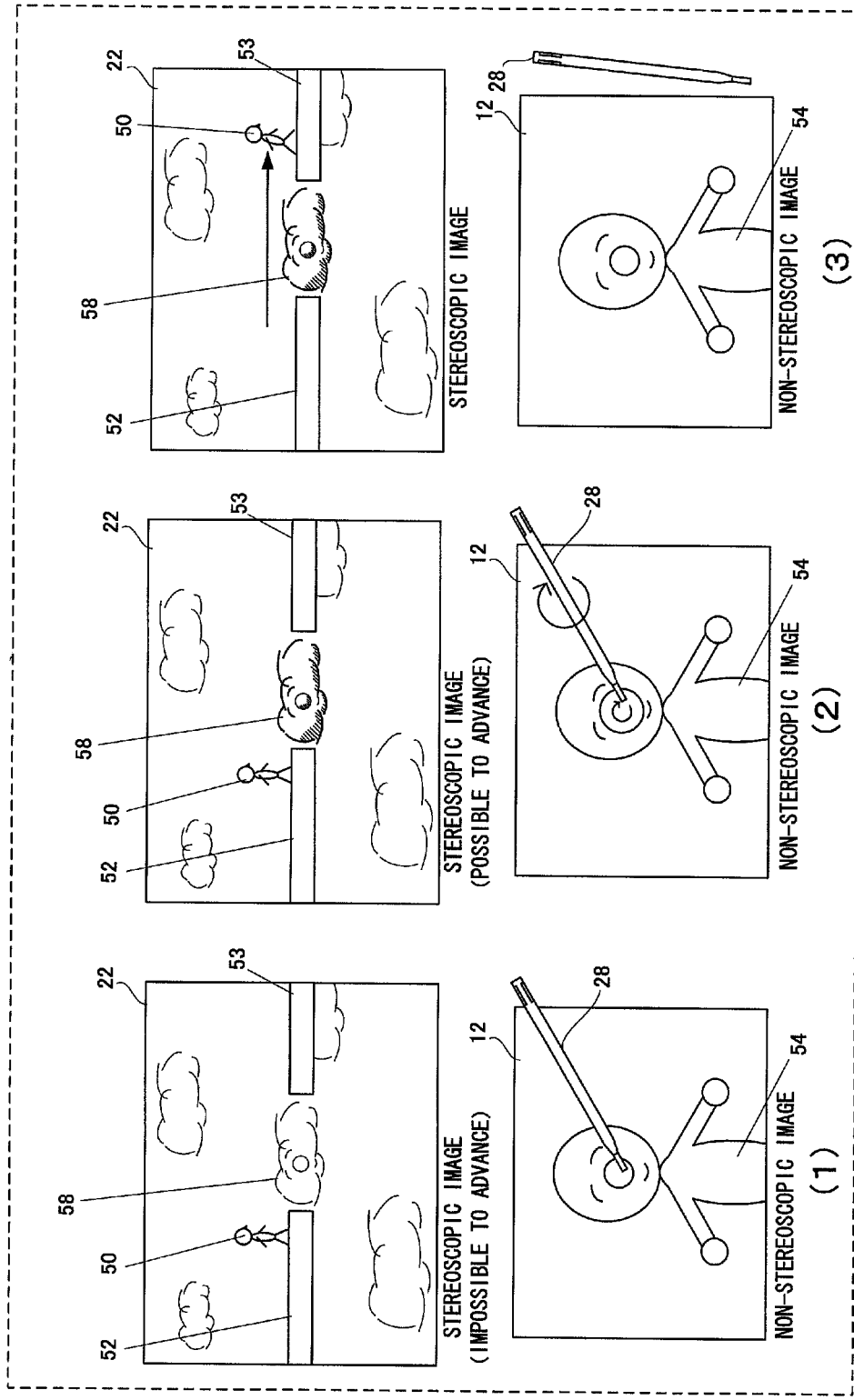
FIG. 8 is diagrams illustrating a non-limiting example of the upper LCD 22 on which a stereoscopic image is displayed and the lower LCD 12 on which a non-stereoscopic image is displayed.

Next, an example of a type of a change object that changes from a planar shape to a three-dimensional shape will be described with reference to FIG. 8. In FIG. 8(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. Here, as shown in FIG. 8(1), in the stereoscopic image on the upper LCD 22, a change object 58 that is a cloud object is displayed between the path object 52 and the path object 53. The path objects 52 and 53 and the player object 50 are displayed with such disparities that these objects are viewed at the same depth as seen from the player (these objects are located in positions of the same depth). The change object 58 has a portion (a round portion) that suggests the nose part of the person object 54 displayed on the lower LCD 12. In addition, the change object 57 has a planar shape in the stereoscopic image (is viewed as a planar shape), and is displayed with such a disparity that the change object 57 is viewed at the same depth (distance) as that of the path objects 52 and 53 and the player object 50 as seen from the player. The change object 57 is located in such a position that the player is made to imagine that when the density of the change object 58 as a cloud becomes high as if the player object 50 could stand on the change object 58, the player object 50 can advance over the change object 58. As shown in FIG. 8(1), the player touches, with the touch pen 28, the nose part of the person object 54 that is suggested by the round portion of the change object 58. The nose part of the person object 54 is associated with the change object 58, and is displayed in an enlarged manner when this touching is made. As shown in FIG. 8(2), when the player circularly moves the touching touch pen 28 as if stroking the nose of the person object 54, the change object 58 associated with the nose changes from the planar shape to a three-dimensional shape that makes the player feel that the density of the change object 58 as a cloud becomes high. As a result, a state is provided where the player object 50 can advance over the change object 58. Then, when the player separates the touch pen 28 from the lower LCD 12, the nose displayed in an enlarged manner returns to its original state as shown in FIG. 8(3). Meanwhile, the change object 58 keeps the changed state. Then, the player operates the analog stick 15 or the like to cause the player object 50 to go over the change object 58 to advance from the path object 52 to the path object 53 as shown in FIG. 8(3). As a result, the game progresses.

Figure 9:
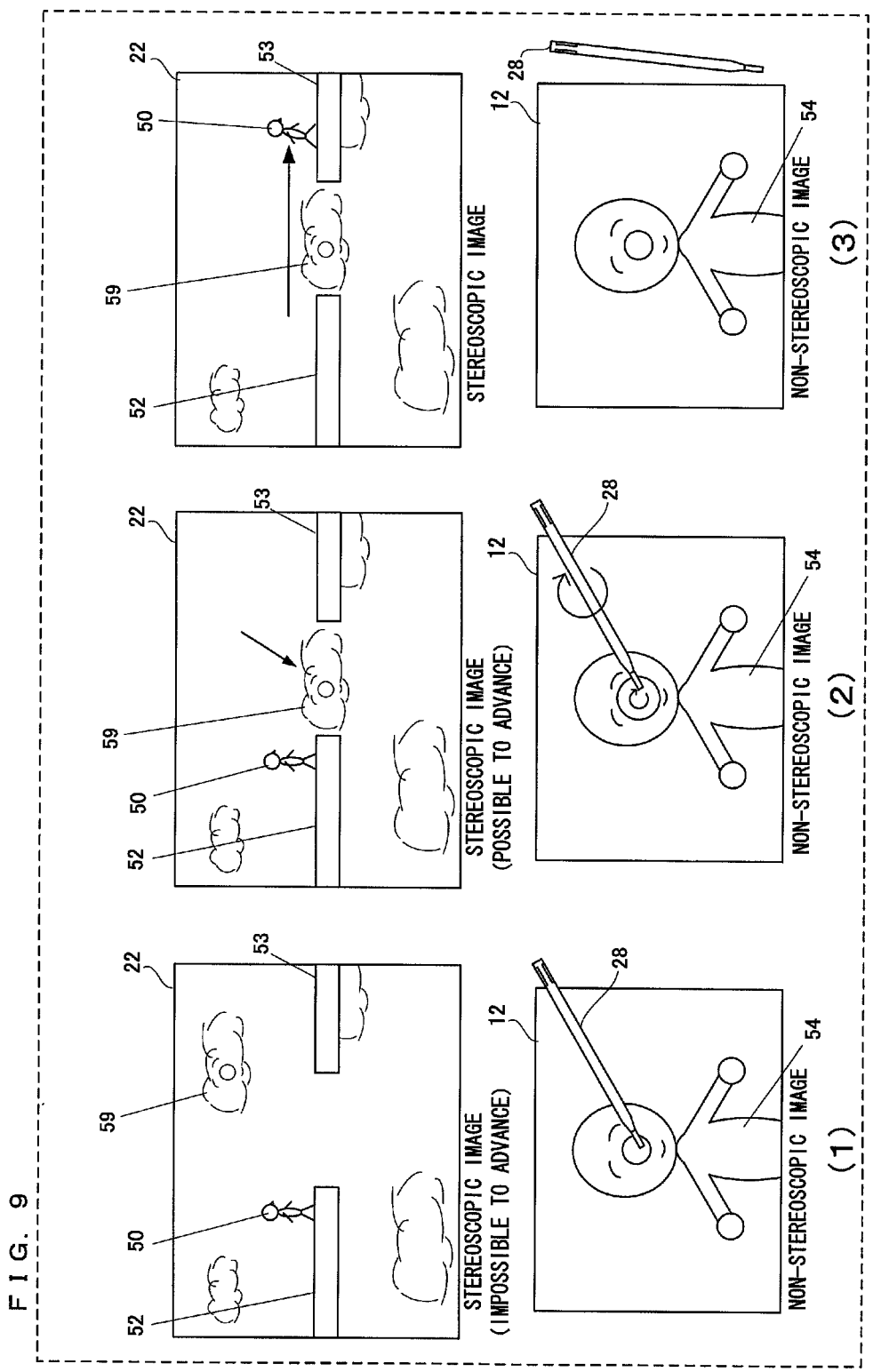
FIG. 9 is diagrams illustrating a non-limiting example of the upper LCD 22 on which a stereoscopic image is displayed and the lower LCD 12 on which a non-stereoscopic image is displayed.

Next, an example of a type of a change object that changes so as to move will be described with reference to FIG. 9. In FIG. 9(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. Here, as shown in FIG. 9(1), in the stereoscopic image on the upper LCD 22, a change object 59 that is a cloud object is displayed above the path object 53. The path objects 52 and 53, the change object 59, and the player object 50 are displayed with such disparities that these objects are viewed at the same depth as seen from the player (these objects are located in positions of the same depth). The change object 59 has a portion (a round portion) that suggests the nose part of the person object 54 displayed on the lower LCD 12. As shown in FIG. 9(1), the player touches, with the touch pen 28, the nose part of the person object 54 that is suggested by the round portion of the change object 59. The nose part of the person object 54 is associated with the change object 59, and is displayed in an enlarged manner when this touching is made. As shown in FIG. 9(2), when the player circularly moves the touching touch pen 28 as if stroking the nose of the person object 54, the change object 59 associated with the nose changes so as to move to a position between the path object 52 and the path object 53. As a result, a state is provided where the player object 50 can advance over the change object 59. Then, when the player separates the touch pen 28 from the lower LCD 12, the nose displayed in an enlarged manner returns to its original state as shown in FIG. 9(3). Meanwhile, the change object 59 keeps the changed state. Then, the player operates the analog stick 15 or the like to cause the player object 50 to go over the change object 59 to advance from the path object 52 to the path object 53 as shown in FIG. 9(3). As a result, the game progresses.

Figure 10:
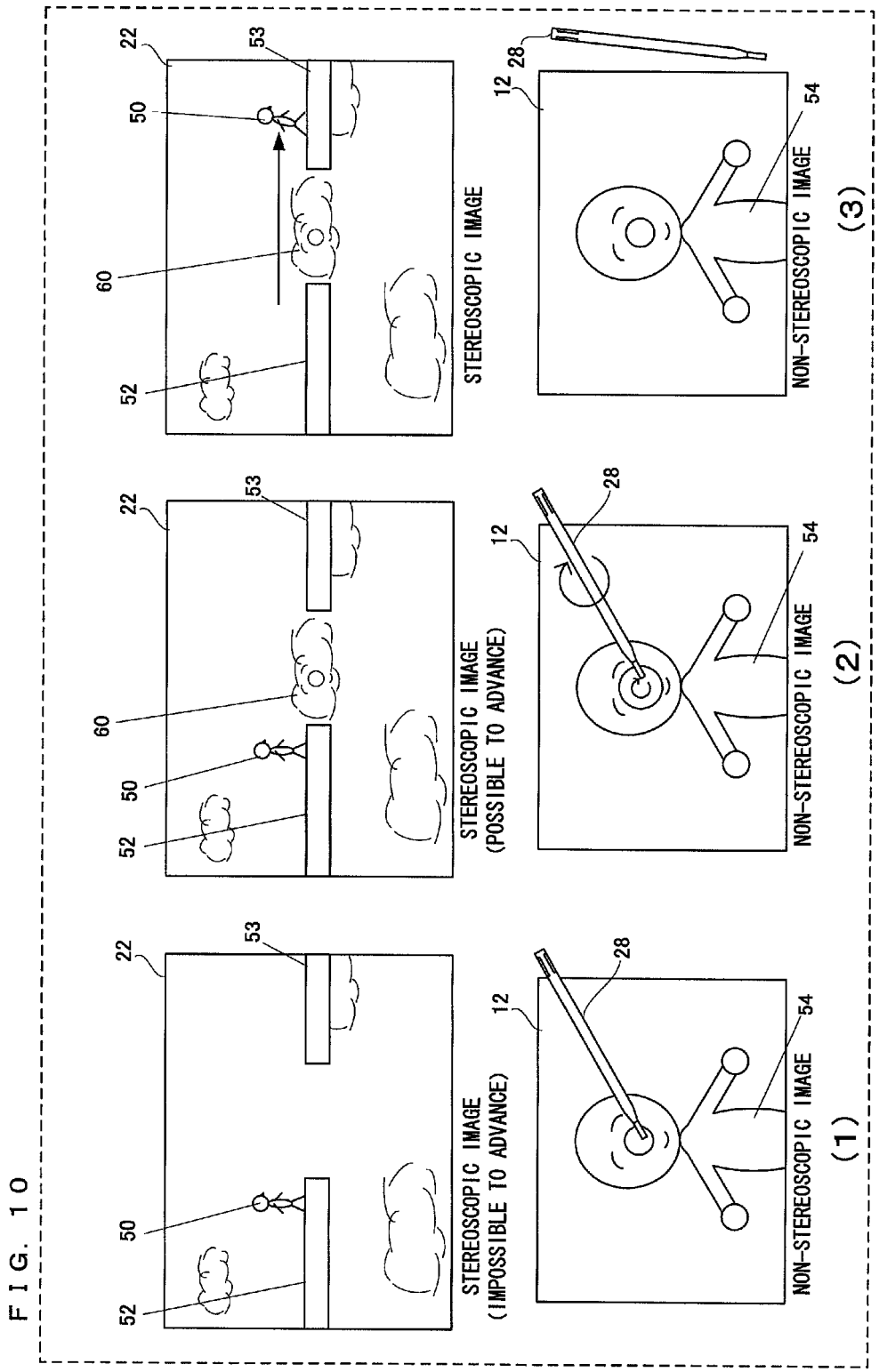
FIG. 10 is diagrams illustrating a non-limiting example of the upper LCD 22 on which a stereoscopic image is displayed and the lower LCD 12 on which a non-stereoscopic image is displayed.

Next, an example of a type of a change object that emerges will be described with reference to FIG. 10. In FIG. 10(1), similarly to FIG. 4(1), an advancement impossible situation where the interval between the path object 52 and the path object 53 is large and thus the player object 50 cannot move (advance) from the path object 52 to the path object 53 is stereoscopically displayed on the upper LCD 22. The path objects 52 and 53 and the player object 50 are displayed with such disparities that these objects are viewed at the same depth as seen from the player (these objects are located in positions of the same depth). Here, in the advancement impossible situation shown in FIG. 10(1), unlike the cases described with reference to FIGS. 4 to 9, a change object is not displayed, and which part of the person object 54 should be operated is not suggested. Thus, the player touches each part (arm, belly, head, eye, mouth, nose, and the like) of the person object 54 with the touch pen 28 to search for a part that is set as an operation target of the person object 54. Here, the nose part of the person object 54 is set as an operation target, and is associated with a below-described change object 60 that has not been displayed yet. When the player touches the nose part of the person object 54 with the touch pen 28 as shown in FIG. 10(1), the nose part is displayed in an enlarged manner as shown in FIG. 10(2). Then, as shown in FIG. 10(2), when the player circularly moves the touching touch pen 28 as if stroking the nose of the person object 54, the change object 60 associated with the nose emerges between the path object 52 and the path object 53 at the same depth as that of these objects. As a result, a state is provided where the player object 50 can advance over the change object 60. Then, when the player separates the touch pen 28 from the lower LCD 12, the nose displayed in an enlarged manner returns to its original state as shown in FIG. 10(3). Meanwhile, the change object 60 keeps the emerging state. Then, the player operates the analog stick 15 or the like to cause the player object 50 to go over the change object 60 to advance from the path object 52 to the path object 53 as shown in FIG. 10(3). As a result, the game progresses.

As described above, in the exemplary embodiment, the advancement impossible situations are set so as to appear during progress of the game using a stereoscopic image displayed on the upper LCD 22. When an advancement impossible situation appears, the player operates the person object 54 displayed non-stereoscopically on the lower LCD 12, with the touch pen 28 to provide a state where the player object 50 can advance, and progresses the game. Thus, each time an advancement impossible situation appears, the player naturally moves their line of sight from the stereoscopic image displayed on the upper LCD 22 to the non-stereoscopic image displayed on the lower LCD 12 while enjoining the situation as a game event. As a result, according to the exemplary embodiment, the player's eyes can be relaxed and a change is given to the player's eyes while making the player continue the game. Thus, the player can be prevented from feeling tired or bored due to keeping on watching the stereoscopic image.

(Details of Game Processing)

Figure 11:
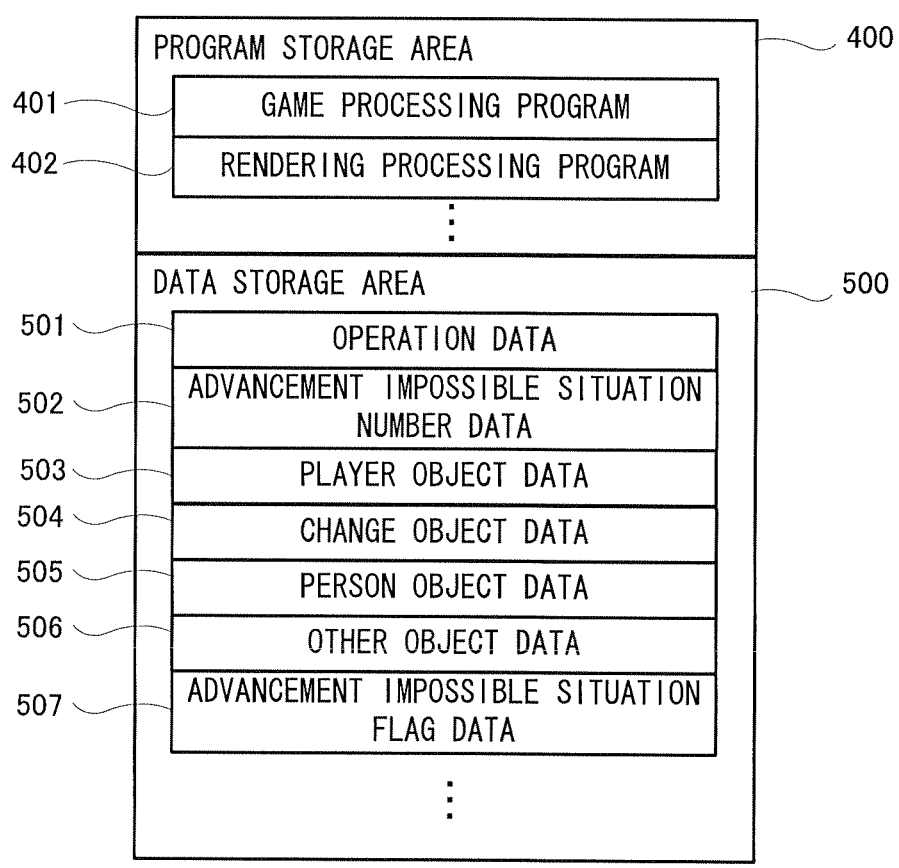
FIG. 11 is a diagram illustrating a non-limiting example of a memory map of a main memory 32 of the game apparatus 10.

Next, game processing performed by the game apparatus 10 will be described in detail. First, data stored in the main memory 32 during the game processing will be described. FIG. 11 is a diagram illustrating a memory map of a main memory 32 of the game apparatus 10. As shown in FIG. 11, the main memory 32 includes a program storage area 400 and a data storage area 500. A part of data in the program storage area 400 and the data storage area 500 is stored, for example, in the external memory 44, and is read out and stored in the main memory 32 when the game processing is performed.

Figure 12:
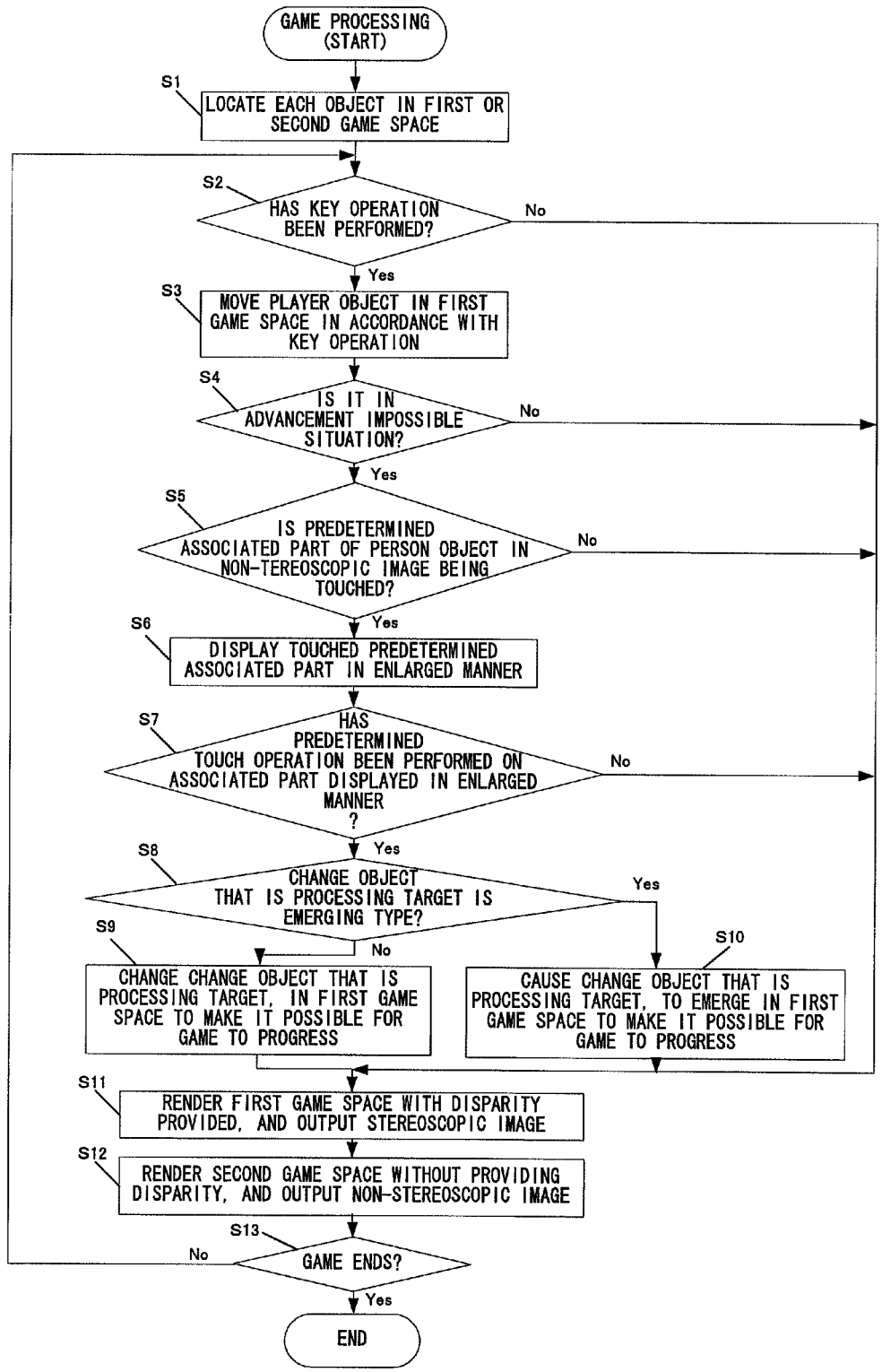
FIG. 12 is a non-limiting example of a flowchart of game processing performed by a CPU 311.

In the program storage area 400, programs, such as a game processing program 401 that performs processing in a flowchart shown in FIG. 12 described below and a rendering processing program 402 that performs rendering processing in the processing in the flowchart shown in FIG. 12, are stored.

In the data storage area 500, operation data 501, advancement impossible situation number data 502, player object data 503, change object data 504, person object data 505, other object data 506, advancement impossible situation flag data 507, and the like are stored.

The operation data 501 indicates an operation performed by the user on each of the operation buttons 14A to 14E and 14G to 14H, the analog stick 15, and the touch panel 13. The operation data 501 indicates, for example, an operation performed on the analog stick 15 for moving the player object 50 and an operation performed on the person object 54 with the touch pen 28.

The advancement impossible situation number data 502 indicates a number that identifies an advancement impossible situation that is being displayed on the upper LCD 22. Specifically, a unique number is set to each of the advancement impossible situations that are set so as to appear during progress of the game, and the advancement impossible situation number data 502 indicates the unique number of an advancement impossible situation that is being displayed on the upper LCD 22. Thus, each time the next advancement impossible situation is displayed on the upper LCD 22, the advancement impossible situation number data 502 is updated to data indicating the unique number of this advancement impossible situation.

The player object data 503 is data regarding the player object 50 described with reference to FIGS. 4 to 10, and indicates a position (a position including a depth), an orientation, a shape (polygon shape), a color (texture), and the like of the player object 50.

The change object data 504 is data regarding the change objects (51 and 55 to 60) described with reference to FIGS. 4 to 10, and indicates a position (a position including a depth), an orientation, a shape (polygon shape), a color (texture), and the like of each change object. In addition, the change object data 504 includes information that indicates which advancement impossible situation each change object corresponds to. The change object data 504 also includes information that indicates which part (arm, nose, and the like) of the person object 54 described with reference to FIGS. 4 to 10 is associated as an associated part with each change object. The change object data 504 also includes information that indicates the content of an operation (touch operation) that should be performed with the touch pen 28 on a part of the person object 54 associated with each change object. Further, the change object data 504 includes information that indicates whether each change object is any of the types of change objects that change and are described with reference to FIGS. 4 to 9 or the type of a change object that emerges and is described with reference to FIG. 10. Moreover, the change object data 504 includes information for changing the types of change objects that change and are described with reference to FIGS. 4 to 9, and information used for causing the type of a change object that emerges and is described with reference to FIG. 10, to emerge.

The person object data 505 is data regarding the person object 54 described with reference to FIGS. 4 to 10, and indicates a position, an orientation, a shape (polygon shape), a color (texture), and the like of the person object 54. In addition, the person object data 505 includes information for displaying, in an enlarged manner, a part (arm, nose, or the like) of the person object 54 that is operated with the touch pen 28 as described with reference to FIGS. 4 to 10.

The other object data 506 is data regarding a background object for representing a background, path objects (52 and the like), cloud objects (see FIGS. 4 to 10) that are not the change objects, and indicates positions (positions including depths), orientations, shapes (polygon shapes), colors (textures), and the like of these objects.

The advancement impossible situation flag data 507 indicates an advancement impossible situation flag that represents whether or not it is in an advancement impossible situation. The advancement impossible situation flag automatically keeps an ON state while an advancement impossible situation is displayed on the upper LCD 22, and automatically keeps an OFF state while no advancement impossible situation is displayed on the upper LCD 22.

Next, a flow of the game processing performed by the game apparatus 10 will be described with reference to FIG. 12. When the game apparatus 10 is powered on, the CPU 311 of the game apparatus 10 executes a boot program stored in the internal data storage memory 35 or the like, thereby initializing each unit such as the main memory 32. Then, the game processing program 401 and the like stored in the external memory 44 are loaded into the main memory 32, and the game processing program 401 is executed by the CPU 311.

FIG. 12 is an example of a flowchart of the game processing performed by the CPU 311. The processing shown in the flowchart of FIG. 12 is repeatedly performed in every single frame (e.g., 1/60 sec). In the following, a description of processes that do not directly relate to the exemplary embodiments disclosed herein is omitted.

First, at step S1, the CPU 311 locates each object at a predetermined initial position in a first game space (first virtual three-dimensional space) or a second game space (second virtual three-dimensional space). Specifically, the CPU 311 refers to the player object data 503, the change object data 504, the person object data 505, the other object data 506, and the like, locates the player object 50, the path objects 52 and the like, and the change objects 51 and 55 to 59, and the like in the first game space, and locates the person object 54 in the second game space. Then, the processing proceeds to step S2.

At step S2, the CPU 311 refers to the operation data 501 in the main memory 32 and determines whether or not a key operation has been performed by the player. Specifically, the CPU 311 refers to the operation data 501 and determines whether or not an operation for moving the player object 50 has been performed by the player with the analog stick 15 or the like. When a result of the determination at step S2 is Yes, the processing returns to step S3. When the result of the determination is NO, the processing proceeds to step S11.

At step S3, the CPU 311 moves the player object 50 in the first game space in accordance with the content of the key operation determined at step S2. For example, the CPU 311 advances the player object 50 in accordance with the key operation. It should be noted that in a situation where it is determined as YES at step S4 described below (in an advancement impossible situation), the player object 50 cannot advance further as described with reference to FIGS. 4 to 10. Then, the processing proceeds to step S4.

At step S4, the CPU 311 determines whether or not it is in an advancement impossible situation. Specifically, the CPU 311 refers to the advancement impossible situation flag data 507, determines that it is in an advancement impossible situation when the advancement impossible situation flag is ON, and determines that it is not in an advancement impossible situation when this flag is OFF. When a result of the determination at step S4 is YES, the processing proceeds to step S5. When the result of the determination is NO, the processing proceeds to step S11.

At step S5, the CPU 311 determines whether or not a predetermined associated part of the person object 54 within a non-stereoscopic image on the lower LCD 12 is being touched. Specifically, the CPU 311 refers to the advancement impossible situation number data 502 and identifies which advancement impossible situation is currently displayed on the upper LCD 22. Then, the CPU 311 refers to the change object data 504, identifies a change object corresponding to the identified advancement impossible situation, and identifies a part (an associated part) of the person object 54 that is associated with the identified change object. Then, the CPU 311 refers to the operation data 501 and determines whether or not the identified associated part of the person object 54 is being touched with the touch pen 28. For example, the CPU 311 refers to the advancement impossible situation number data 502 and identifies that the advancement impossible situation currently displayed on the upper LCD 22 is the advancement impossible situation described with reference to FIG. 4. Then, the CPU 311 refers to the change object data 504, identifies the change object 51 corresponding to the advancement impossible situation in FIG. 4, and identifies the right arm part (associated part) of the person object 54 that is associated with the identified change object 51. Then, the CPU 311 refers to the operation data 501 and determines whether or not the right arm part of the person object 54 is being touched with the touch pen 28. When a result of the determination at step S5 is YES, the processing proceeds to step S6. When the result of the determination is NO, the processing proceeds to step S11.

At step S6, by using the person object data 505, the CPU 311 displays, in an enlarged manner, the predetermined associated part determined to be touched at step S5 (see FIGS. 4(2), 5(2), and the like). Then, the processing proceeds to step S7.

At step S7, the CPU 311 determines whether or not a predetermined operation (touch operation) has been performed with the touch pen 28 on the associated part displayed in an enlarged manner at step S6. Specifically, the CPU 311 refers to the change object data 504 and determines whether or not a predetermined touch operation that should be performed on the associated part of the person object 54 that is displayed in an enlarged manner at step S6 has been performed with the touch pen 28. For example, the CPU 311 refers to the change object data 504 and determines whether or not a touch operation for raising the right arm as described with reference to FIG. 4 has been performed on the right arm part of the person object 54 that is displayed in an enlarged manner. Alternatively, for example, the CPU 311 refers to the change object data 504 and determines whether or not a touch operation of circularly moving the touch pen 28 as if stroking the nose as described with reference to FIGS. 5 to 10 has been performed on the nose part of the person object 54 that is displayed in an enlarged manner. When a result of the determination at step S7 is YES, the processing proceeds to step S8. When the result of the determination is NO, the processing proceeds to step S11.

At step S8, the CPU 311 determines whether or not the change object that is a processing target is a type of a change object that emerges. Specifically, the CPU 311 refers to the change object data 504 and determines whether or not the change object corresponding to the advancement impossible situation currently displayed on the upper LCD 22 is a type of a change object that emerges. More specifically, when the change object corresponding to the advancement impossible situation currently displayed on the upper LCD 22 is any of the change objects 51 and 55 to 59 (see FIGS. 4 to 10), the CPU 311 determines that the change object is not a type of a change object that emerges. On the other hand, when the change object corresponding to the advancement impossible situation currently displayed on the upper LCD 22 is the change object 60 (see FIG. 10), the CPU 311 determines that the change object is a type of a change object that emerges. When a result of the determination at step S8 is YES, the processing proceeds to step S10. When the result of the determination is NO, the processing proceeds to step S9.

At step S9, the CPU 311 changes the change object that is the processing target, in the first game space to allow the game to progress. Specifically, the CPU 311 changes the change object that is the processing target, by using information, for changing the change object that is the processing target, which information is included in the change object data 504. For example, when the change object that is the processing target is the change object 51 shown in FIG. 4, the CPU 311 changes the change object 51 so as to raise the branch A as described with reference to FIG. 4, to provide a state where the player object 50 can advance. For example, when the change object that is the processing target is the change object 55 shown in FIG. 5, the CPU 311 changes the change object 55 such that the change object 55 comes to the near side (the player side) (this object is viewed on the near side) as described with reference to FIG. 5, to provide a state where the player object 50 can advance. For example, when the change object that is the processing target is the change object 56 shown in FIG. 6, the CPU 311 changes the change object 56 such that the change object 56 becomes dark in color, which makes the player feel that the density of the change object 56 as a cloud becomes high, as described with reference to FIG. 6, to provide a state where the player object 50 can advance. For example, when the change object that is the processing target is the change object 57 shown in FIG. 7, the CPU 311 changes the change object 57 from the background color to the color that makes the player feel that the density of the change object 57 as a cloud becomes high, as described with reference to FIG. 7, to provide a state where the player object 50 can advance. For example, when the change object that is the processing target is the change object 58 shown in FIG. 8, the CPU 311 changes the change object 58 from the planar shape to the three-dimensional shape that makes the player feel that the density of the change object 57 as a cloud becomes high, as described with reference to FIG. 8, to provide a state where the player object 50 can advance. For example, when the change object that is the processing target is the change object 59 shown in FIG. 9, the CPU 311 changes the change object 59 such that the change object 59 moves to a position between the path object 52 and the path object 53, as described with reference to FIG. 9, to provide a state where the player object 50 can advance. Then, the processing proceeds to step S11.

Meanwhile, at step S10, the CPU 311 causes the change object that is the processing target, to emerge in the first game space to allow the game to progress. Specifically, the CPU 311 causes the change object that is the processing target, to emerge by using information, for causing the change object that is the processing target to emerge, which information is included in the change object data 504. For example, when the change object that is the processing target is the change object 60 shown in FIG. 10, the CPU 311 causes the change object 60 to emerge between the path object 52 and the path object 53 as described with reference to FIG. 10, to provide a state where the player object 50 can advance. Then, the processing proceeds to step S11.

At step S11, the GPU 312 renders the first game space with a disparity provided, and outputs a stereoscopic image to the upper LCD 22. Specifically, the GPU 312 takes images of the first game space with the virtual stereo camera to render a stereoscopic image composed of an image for a left eye and an image for a right eye between which a disparity is provided, and outputs the stereoscopic image to the upper LCD 22. By so doing, the stereoscopic image is displayed on the upper LCD 22 as shown in FIGS. 4 to 10. Then, the processing proceeds to step S12.

At step S12, the GPU 312 renders the second game space without providing a disparity, and outputs a non-stereoscopic image to the lower LCD 12. Specifically, the GPU 312 takes an image of the second game space with the virtual camera (may be considered as the virtual stereo camera to which a disparity is not provided) to render a non-stereoscopic image, and outputs the non-stereoscopic image to the lower LCD 12. By so doing, the non-stereoscopic image is displayed on the lower LCD 12 as shown in FIGS. 4 to 10. Then, the processing proceeds to step S13.

At step S13, the CPU 311 determines whether or not the game has ended. Specifically, the CPU 311 determines whether a predetermined state where the game is cleared is provided, or determines whether or not an operation for ending the game has been performed by the player. When a result of the determination at step S13 is YES, the game processing ends. When the result of the determination is NO, the processing returns to step S2.

As described above, in the exemplary embodiment, the advancement impossible situations are set so as to appear during progress of the game using a stereoscopic image displayed on the upper LCD 22. When an advancement impossible situation appears, the player operates the person object 54 displayed non-stereoscopically on the lower LCD 12, with the touch pen 28 to provide a state where the player object 50 can advance, and progresses the game. Therefore, each time an advancement impossible situation appears, the player naturally moves their line of sight from the stereoscopic image displayed on the upper LCD 22 to the non-stereoscopic image displayed on the lower LCD 12 while enjoining the situation as a game event. As a result, according to the exemplary embodiment, the player's eyes can be relaxed and a change is given to the player's eyes while making the player continue the game. Thus, the player can be prevented from feeling tired or bored due to keeping on watching the stereoscopic image.

(Modifications)

In the exemplary embodiment described above, the mode of change (or emergence) of the change object has been described with reference to FIGS. 4 to 10. However, the mode of change (or emergence) of the change object is not limited thereto. The mode of change (or emergence) of the change object may be, for example, a combination of some of the modes of change (or emergence) described with reference to FIGS. 4 to 10.

In the exemplary embodiment described above, a touch operation performed with the touch pen 28 or the like is detected with the touch panel 13 to detect an operation of the player on the person object 54. However, the method for detecting an operation of the player on the person object 54 is not limited thereto, and may be, for example, a method in which a pointer is displayed in an image on the lower LCD 12 and an operation of the player performed with a mouse or the like is detected.

In the exemplary embodiment described above, when the person object 54 representing a person is operated, the change object makes a change or the like. However, the operated object is not limited to the person object 54 and may be any of other various objects.

In the exemplary embodiment described above, the game in which the player object 50 advances in the game space has been described as an example. However, the game to which the exemplary embodiments disclosed herein are applied is not limited thereto, and the exemplary embodiments disclosed herein are applicable to various types of games.

In the exemplary embodiment described above, the stereoscopic image displayed on the upper LCD 22 has been described as an image that is stereoscopically visible with naked eyes. However, it suffices that a stereoscopically visible image is displayed on the upper LCD 22, and for example, an image that is stereoscopically visible by the player through glasses for stereoscopic view that are worn by the player may be displayed.

In the exemplary embodiment described above, the game apparatus 10 has been described as an example. However, the exemplary embodiments disclosed herein are not limited to application to the game apparatus 10. For example, the exemplary embodiments disclosed herein are also applicable to portable information terminal apparatuses such as a mobile phone, a personal handyphone system (PHS), and a PDA. In addition, the exemplary embodiments disclosed herein are also applicable to a stationary game apparatus, a personal computer, and the like.

In the exemplary embodiment described above, the above processing is performed on the single game apparatus 10. However, the above processing may be performed using a plurality of apparatuses that can communicate with each other in a wired or wireless manner.

In the exemplary embodiment described above, the shape of the game apparatus 10, the shapes, the number, and the installed positions of the various operation buttons 14, the analog stick 15, and the touch panel 13, and the like are merely examples. It is understood that the exemplary embodiments disclosed herein can be implemented with other shapes, numbers and installed positions. The order of the process steps, the set values, the values used for the determinations, and the like which are used in the information processing described above are merely examples. It is understood that the exemplary embodiments disclosed herein can be implemented with other order of process steps and other values.

The various information processing programs executed on the game apparatus 10 of the exemplary embodiment described above may be provided to the game apparatus 10 through not only a storage medium such as the external memory 44 but also through a wired or wireless communication line. Alternatively, the programs may previously be stored in a nonvolatile storage unit (the internal data storage memory 35 or the like) provided in the game apparatus 10. It should be noted that an information storage medium for storing the programs may be a nonvolatile memory as well as a CD-ROM, a DVD, a like optical disc-shaped storage media, a flexible disc, a hard disc, a magneto-optical disc, a magnetic tape, and the like. Further, an information storage medium for storing the programs may be a volatile memory that temporarily stores the programs.

While the game apparatus, the storage medium, the game system, and the game method have been described herein, it is to be understood that the appended claims are not to be limited to the game apparatus, the storage medium, the game system, and the game method disclosed, but on the contrary, are intended to cover various modifications and equivalent arrangements included within the spirit and scope of the appended claims.

What is claimed is:

1. A game apparatus capable of performing stereoscopic display on the basis of a disparity, the game apparatus comprising:
    a first display section configured to perform the stereoscopic display;
    a second display section configured to perform non-stereoscopic display that is not the stereoscopic display;
    a first object locating section configured to virtualize a first game space which is a space in which one or more objects including a first object are located;
    a second object locating section configured to virtualize a second game which is another space that includes a second object that is different from the first object, the second object being associated with the first object;
    a first rendering control section configured to render the first image of the first game space in which the first object is located, with a disparity provided;
    a second rendering control section configured to render the second image of the second game space in which the second object is located, without providing a disparity;

a first display control section configured to cause the first display section to stereoscopically display the first image of the first game space rendered by the first rendering control section;

a second display control section configured to cause the second display section to non-stereoscopically display the second image of the second game space rendered by the second rendering control section;

a pointed position detection section configured to detect a pointed position within the second image displayed on the second display section, on the basis of an input; and a game event control section configured to determine that the second object is operated based on the input and to change the first object displayed on the first display section based on the determination.

2. The game apparatus according to claim 1, further comprising:

an operation reception section configured to receive an operation of the player for controlling a player object that is provided in the first game space; and a player object control section configured to locate the player object in the first game space and controlling the player object on the basis of an operation received by the operation reception section, wherein the first rendering control section renders the first game space so as to set such a disparity that the first object is viewed on a far side of the player object.

3. The game apparatus according to claim 2, wherein when determining that the second object is operated, the game event control section causes the first rendering control section render the first game space so as to change a disparity of the first object such that the first object is viewed on a further near side.

4. The game apparatus according to claim 1, wherein when determining that the second object is operated, the game event control section causes the first rendering control section to change a color of the first object to a darker color and render the first game space.

5. The game apparatus according to claim 1, wherein
the first rendering control section sets a color of the first object to a color close to a background color and renders the first game space, and
when determining that the second object is operated, the game event control section causes the first rendering control section to change the color of the first object to a color different from the background color and render the first game space.

6. The game apparatus according to claim 1, wherein when determining that the second object is operated, the game event control section changes a shape of the first object.

7. The game apparatus according to claim 2, wherein
the first game space is set such that the player object cannot advance further therein, and
when determining that the second object is operated, the game event control section changes the first object so as to allow the player object to advance further.

8. The game apparatus according to claim 1, wherein
the second object is composed of a plurality of parts, and at least one of the plurality of parts is associated as an associated part with the first object, and
when determining that the associated part of the second object is operated, the game event control section changes the first object in accordance with an operation on the associated part.

9. The game apparatus according to claim 8, wherein when determining that the associated part of the second object is operated, the game event control section causes the second display control section to cause the second display section to display the associated part in an enlarged manner, and changes the first object in accordance with an operation on the associated part displayed in an enlarged manner.

10. The game apparatus according to claim 1, wherein the pointed position detection section detects a pointed position within an image displayed on the second display section, by using a touch panel installed in the second display section.

11. A game apparatus capable of performing stereoscopic display on the basis of a disparity, the game apparatus comprising:

a first display section configured to perform the stereoscopic display;

a second display section configured to perform non-stereoscopic display that is not the stereoscopic display;

a first object locating section configured to virtualize a first game space which is a space in which one or more objects including a first object are located;

a second object locating section configured to virtualize a second game space that includes a second object that is different from the first object;

a first rendering control section configured to render the first game space with a disparity provided;

a second rendering control section configured to render the second game space, including at least some portion of the second object, without providing a disparity;

a first display control section configured to cause the first display section to stereoscopically display a first image based on the rendered first game space;

a second display control section configured to cause the second display section to non-stereoscopically display a second image in accordance with the rendered second game space;

a pointed position detection section configured to detect a pointed position within the second image displayed on the second display section in accordance with input from a player; and a game event control section configured to:
determine that the second object is operated with the input from the player; and
cause the first object to stereoscopically emerge from an image displayed on the first display section based on the determination that the second object is operated with input from the player.

12. A non-transitory computer-readable storage medium having stored therein a game program that is executed by a computer of a game apparatus capable of performing stereoscopic display on the basis of a disparity, the game program causing the computer to operate as:

a first object locating section configured to virtualize a first game space, which is a space in which a plurality of objects including a first object are located;

second object locating section configured to virtualize a second game space that includes a second object that is different from the first object located in the first game space, the second object being associated with the first object located in the first game space;

a first rendering controller configured to render the first game space in which the first object is located, with a disparity provided;

a second rendering controller configured to render the second game space in which the second object is located, without providing a disparity;

a first display controller configured to cause a first display section configured to perform the stereoscopic display, to stereoscopically display the first game space, including the first object, rendered by the first rendering controller;

a second display controller configured to cause a second display section configured to perform non-stereoscopic display that is not the stereoscopic display, to non-stereoscopically display the second game space, including the second object, rendered by the second rendering controller;

a pointed position detector configured to detect a pointed position within an image displayed on the second display section, on the basis of an input of a player; and a game event controller configured to determine that the second object is operated, on the basis of a result of the detection by the pointed position detector, and to change the first object displayed on the first display section, on the basis of the determination.

13. The computer-readable storage medium according to claim 12, wherein the game program further causes the computer to operate as:

an operation reception section configured to receive an operation of the player; and a player object controller configured to locate a player object in the first game space and controlling the player object on the basis of an operation received by the operation reception section, and the first rendering controller renders the first game space so as to set such a disparity that the first object is viewed on a far side of the player object.

14. The computer-readable storage medium according to claim 13, wherein when determining that the second object is operated, the game event controller causes the first rendering controller render the first game space so as to change a disparity of the first object such that the first object is viewed on a further near side.

15. The computer-readable storage medium according to claim 12, wherein when determining that the second object is operated, the game event controller causes the first rendering controller to change a color of the first object to a darker color and render the first game space.

16. The computer-readable storage medium according to claim 12, wherein the first rendering controller sets a color of the first object to a color close to a background color and renders the first game space, and when determining that the second object is operated, the game event controller causes the first rendering controller to change the color of the first object to a color different from the background color and render the first game space.

17. The computer-readable storage medium according to claim 12, wherein when determining that the second object is operated, the game event controller changes a shape of the first object.

18. The computer-readable storage medium according to claim 13, wherein the first game space is set such that the player object cannot advance further, and when determining that the second object is operated, the game event controller changes the first object so as to allow the player object to advance further.

19. The computer-readable storage medium according to claim 12, wherein the second object is composed of a plurality of parts, and at least one of the plurality of parts is associated as an associated part with the first object, and when determining that the associated part of the second object is operated, the game event controller changes the first object in accordance with an operation on the associated part.

20. The computer-readable storage medium according to claim 19, wherein when determining that the associated part of the second object is operated, the game event controller causes the second display controller to cause the second display section to display the associated part in an enlarged manner, and changes the first object in accordance with an operation on the associated part displayed in an enlarged manner.

21. The computer-readable storage medium according to claim 12, wherein the pointed position detector detects a pointed position within an image displayed on the second display section, by using a touch panel installed in the second display section.

22. A non-transitory computer-readable storage medium having stored therein a game program that is executed by a computer of a game apparatus capable of performing stereoscopic display on the basis of a disparity, the game program comprising instructions that are, when executed by the computer, configured to:

locate a first object in a first game space;
locate a second object in a second game space;
render the first game space with a disparity provided;
render the second game space in which the second object is located, without providing a disparity;
cause a first display section configured to perform the stereoscopic display, to stereoscopically display an image of the rendered first game space with the provided disparity;
cause a second display section configured to perform non-stereoscopic display to non-stereoscopically display an image of the rendered second game space;
detect a pointed position within the image of the rendered second game space displayed on the second display section in accordance with an input of a game player; and
adjust a stereoscopic depth of the displayed first object of the first game space in accordance with the input of the game player provided to the second display section.

23. A game method used in a game apparatus with a processing system that includes at least one processor, the game apparatus capable of performing stereoscopic display on the basis of a disparity, the game method comprising:

virtualizing a first game space that includes a plurality of game objects including a first object;
virtualizing a second game space that includes a second object that is different form the first object of the the first game space, the second being associated with the first object;
rendering, using the processing system, a stereoscopic image of the first game space in which the first object is located, the first stereoscopic image including at some part of the first object;
rendering, using the processing system, an non-stereoscopic image of the second game space without providing a disparity, the image including at least some part of the second object;
causing a first display section to stereoscopically display the rendered stereoscopic image;
causing a second display section to non-stereoscopically display the non-stereoscopic image;
detecting a pointed position within the non-stereoscopic image displayed on the second display section in accordance with input provided from a player; and performing a determination, using the processing system, that the second object is operated based on a result of the detection by the detecting pointed position; and changing how the first object is displayed on the first display section in the rendered stereoscopic image in accordance with the performed determination that the second object displayed on the second display section is operated.

24. A game method used in a game apparatus with a processing system that includes at least one processor, the game apparatus capable of performing stereoscopic display on the basis of a disparity, the game method comprising:

locating a second object in a second game space;

generating, using the processing system, a stereoscopic image of a first game space that includes at least some part of a first object;

generating, using the processing system, a non-stereoscopic image of the second game space that includes at least some part of the second object;

causing a first display section to stereoscopically display the generated stereoscopic image;

causing a second display section to non-stereoscopically display the generated non-stereoscopic image;

detecting a pointed position within the displayed non-stereoscopic image on the second display section based on an input of a player; and determining that the second object is operated on based on the detected pointed position; and causing, using the processing system, the first object to stereoscopically emerge from an image displayed on the first display section relative to the generated stereoscopic image.

25. A game system capable of performing stereoscopic display on the basis of a disparity, the game system comprising;

a first display configured to stereoscopically display images;

a second display that is different from the first display;

a processing system including at least one processor, the processing system configured to:

generate a stereoscopic image of at least a first object that is provided in a first virtual space;

generate another image of at least a second object that is provided in a second virtual space, the second object being different from the first object and associated with the first object;

output the generated stereoscopic image of at least the first object to the first display for display thereon;

output the generate another image of at least the second object to the second display for display thereon;

detect an indicated position within the another image displayed on the second display in accordance with input provided from a player; and change how the first object is displayed on the first display section based on the indicated position input provided.

26. An information processing system configured to execute games thereon, the information processing system comprising:

a stereoscopic display;

a processing system including at least one processor and a memory, the processing system configured to:

generate a stereoscopic image that shows at least part of a first object that is located in a first virtual space;

generate another image that shows at least part of a second object that is different from the first object;

output the stereoscopic image to the stereoscopic display for display thereon;

output the another image to a display for viewing by a user;

accept input to control the second object while the another image and stereoscopic image are displayed; and adjust a stereoscopic depth of the first object that is being displayed on the stereoscopic display in accordance with the accepted input so as to display an adjusted version of the stereoscopic image on the stereoscopic display with the first object displayed at the adjusted stereoscopic depth.

27. The information processing system of claim 26, wherein other objects in the generated stereoscopic image are not adjusted in stereoscopic depth for the adjusted version of the stereoscopic image based on control user to control the second object.

* * * * *